(12) United States Patent
Atwood et al.

(10) Patent No.: US 7,088,812 B1
(45) Date of Patent: *Aug. 8, 2006

(54) CALL MANAGEMENT IMPLEMENTED USING CALL ROUTING ENGINE

(75) Inventors: Clifford Atwood, Harvard, MA (US); Jerry Stern, Sudbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 10/843,724

(22) Filed: May 12, 2004

Related U.S. Application Data

(63) Continuation of application No. 09/619,875, filed on Jul. 20, 2000, now Pat. No. 6,807,269.

(51) Int. Cl.
  H04M 7/00 (2006.01)
  H04M 3/42 (2006.01)
  H04M 3/523 (2006.01)
  H04M 3/54 (2006.01)
  H04M 3/58 (2006.01)

(52) U.S. Cl. .................. 379/220.01; 379/207.14; 379/207.15; 379/212.01; 379/265.02; 379/901

(58) Field of Classification Search .......... 379/201.01, 379/201.02, 201.12, 207.02, 207.14, 207.15, 379/212.01, 214.01, 219, 220.01, 265.01, 379/265.02, 265.09, 901
See application file for complete search history.

(56) References Cited

U.S. PATENT DOCUMENTS

| | | | |
|---|---|---|---|
| 3,912,873 A | 10/1975 | Skaperda | |
| 4,289,934 A | 9/1981 | Pitroda et al. | |
| 4,348,554 A | 9/1982 | Asmuth | |
| 4,466,098 A | 8/1984 | Southard | |
| 4,527,157 A | 7/1985 | Krikor | |
| 4,605,928 A | 8/1986 | Georgiou | |
| 4,674,036 A | 6/1987 | Conforti | |
| 4,696,028 A | 9/1987 | Morganstein et al. | |
| 4,700,381 A | 10/1987 | Eher | |
| 4,737,983 A | 4/1988 | Frauenthal et al. | |
| 4,755,995 A | 7/1988 | Anderson et al. | |
| 4,757,267 A | 7/1988 | Riskin | |
| 4,788,718 A | 11/1988 | McNabb et al. | |
| 4,866,763 A | 9/1989 | Cooper et al. | |
| 4,881,261 A | 11/1989 | Oliphant et al. | |
| 4,951,310 A | 8/1990 | Honda et al. | |
| 4,988,209 A | 1/1991 | Davidson et al. | |
| 5,023,868 A | 6/1991 | Davidson et al. | |

(Continued)

FOREIGN PATENT DOCUMENTS

WO WO 92/09164 5/1992

OTHER PUBLICATIONS

GeoTel Intelligent Call Router, Managing the Interaction Between Customer and Answering Resources, Mar. 1997, pp. 1-9.

(Continued)

*Primary Examiner*—Harry S. Hong
(74) *Attorney, Agent, or Firm*—Cesari and McKenna LLP

(57) ABSTRACT

Call management techniques are implemented using a call routing engine. In the invention the routing engine centrally controls a public network to facilitate implementation of post-routing call processing of a call. The call routing engine provides switching which makes the public network appear as under the control of a virtual switch. Control of the public network by the call routing engine appearing as a virtual switch may implement post-routing call processing of telephone calls.

38 Claims, 8 Drawing Sheets

U.S. PATENT DOCUMENTS

| | | |
|---|---|---|
| 5,031,211 A | 7/1991 | Nagai et al. |
| 5,036,535 A | 7/1991 | Gechter et al. |
| 5,062,103 A | 10/1991 | Davidson et al. |
| 5,073,890 A | 12/1991 | Danielsen |
| 5,109,404 A | 4/1992 | Katz et al. |
| 5,113,430 A | 5/1992 | Richardson, Jr. et al. |
| 5,134,704 A | 7/1992 | Leuty |
| 5,153,909 A | 10/1992 | Beckle et al. |
| 5,164,983 A | 11/1992 | Brown et al. |
| 5,175,866 A | 12/1992 | Childress et al. |
| 5,193,110 A | 3/1993 | Jones et al. |
| 5,214,688 A | 5/1993 | Szlam et al. |
| 5,226,075 A | 7/1993 | Funk et al. |
| 5,270,699 A | 12/1993 | Signaigo et al. |
| 5,271,058 A | 12/1993 | Andrews et al. |
| 5,282,244 A | 1/1994 | Fuller et al. |
| 5,291,492 A | 3/1994 | Andrews et al. |
| 5,291,550 A | 3/1994 | Levy et al. |
| 5,291,551 A | 3/1994 | Conn et al. |
| 5,291,552 A | 3/1994 | Kerrigan et al. |
| 5,299,259 A | 3/1994 | Otto |
| 5,309,505 A | 5/1994 | Szlam et al. |
| 5,309,513 A | 5/1994 | Rose |
| 5,317,627 A | 5/1994 | Richardson, Jr. et al. |
| 5,333,133 A | 7/1994 | Andrews et al. |
| 5,333,188 A | 7/1994 | Bogart et al. |
| 5,333,308 A | 7/1994 | Ananthanpillai |
| 5,335,233 A | 8/1994 | Nagy |
| 5,335,268 A | 8/1994 | Kelly, Jr. et al. |
| 5,335,269 A | 8/1994 | Steinlicht |
| 5,341,374 A | 8/1994 | Lewen et al. |
| 5,353,339 A | 10/1994 | Scobee |
| 5,355,403 A | 10/1994 | Richardson, Jr. et al. |
| 5,381,415 A | 1/1995 | Mizutani |
| 5,392,345 A | 2/1995 | Otto |
| 5,392,346 A | 2/1995 | Hassler et al. |
| 5,402,474 A | 3/1995 | Miller et al. |
| 5,404,350 A | 4/1995 | DeVito et al. |
| 5,442,691 A | 8/1995 | Price et al. |
| 5,450,482 A | 9/1995 | Chen et al. |
| 5,452,350 A | 9/1995 | Reynolds et al. |
| 5,459,780 A | 10/1995 | Sand |
| 5,465,286 A | 11/1995 | Clare et al. |
| 5,528,678 A | 6/1996 | Kaplan |
| 5,530,744 A | 6/1996 | Charalambous et al. |
| 5,546,452 A | 8/1996 | Andrews et al. |
| 5,590,188 A | 12/1996 | Crockett |
| 5,592,477 A | 1/1997 | Farris et al. |
| 5,633,924 A | 5/1997 | Kaish et al. |
| 5,649,108 A | 7/1997 | Spiegel et al. |
| 5,689,518 A | 11/1997 | Galand et al. |
| 5,694,407 A | 12/1997 | Glaise |
| 5,715,306 A | 2/1998 | Sunderman et al. |
| 5,757,895 A | 5/1998 | Aridas et al. |
| 5,787,160 A | 7/1998 | Chaney et al. |
| 5,787,163 A | 7/1998 | Taylor et al. |
| 5,848,143 A | 12/1998 | Andrews et al. |
| 5,873,130 A | 2/1999 | Lafferty |
| 5,878,130 A | 3/1999 | Andrews et al. |
| 5,910,984 A | 6/1999 | Low |
| 5,923,745 A | 7/1999 | Hurd |
| 5,974,114 A | 10/1999 | Blum et al. |
| 6,002,665 A | 12/1999 | Choe |
| 6,002,756 A | 12/1999 | Lo et al. |
| 6,005,920 A | 12/1999 | Fuller et al. |
| 6,070,142 A | 5/2000 | McDonough et al. |
| 6,072,773 A | 6/2000 | Fichou et al. |
| 6,134,530 A | 10/2000 | Bunting et al. |
| 6,275,574 B1 | 8/2001 | Oran |
| 6,275,930 B1 | 8/2001 | Bonamico |
| 6,363,065 B1 | 3/2002 | Thornton et al. |
| 6,397,345 B1 | 5/2002 | Edmonds et al. |
| 6,411,621 B1 | 6/2002 | Norton et al. |
| 6,426,955 B1 | 7/2002 | Gossett Dalton et al. |
| 6,453,039 B1 | 9/2002 | Cutting et al. |
| 6,459,788 B1 * | 10/2002 | Khuc et al. ............ 379/265.09 |
| 6,501,839 B1 | 12/2002 | Cutting et al. |
| 6,522,743 B1 | 2/2003 | Hurd |
| 6,529,959 B1 | 3/2003 | Armistead et al. |
| 6,542,586 B1 | 4/2003 | Helstab |
| 6,553,113 B1 | 4/2003 | Dhir et al. |
| 6,556,672 B1 | 4/2003 | Holland et al. |
| 6,570,855 B1 | 5/2003 | Kung et al. |
| 6,584,093 B1 | 6/2003 | Salama et al. |
| 6,674,852 B1 | 1/2004 | Hamilton |
| 6,690,789 B1 | 2/2004 | Hamilton |
| 6,801,613 B1 | 10/2004 | Hamilton |
| 6,807,269 B1 * | 10/2004 | Atwood et al. ........ 379/220.01 |

OTHER PUBLICATIONS

GeoTel Intelligent Call Router, Delivering the Right Information to the Right Resource for Every Customer Interaction, Copyright 1999, pp. 1-11.

GeoTel Network Intelligent Call Router, Differentiating Your Network with Enhanced Service Offerings, Virtual Call Center and CTI Capabilities, pp. 1-8.

"Softwire License, Hardware Purchase and Technical Support Agreement", entered into by Geo Tel Communications Corporation, a predecessor in interest to the current Assignee of the subject application, and Putnam Investments, Inc. of Boston, MA 1998.

Slides entitled Desklink Overview; dated Dec. 2, 1998, were used in an oral presentation made to a propspective customer of Geo Tel on Dec. 2, 1998.

International Search Report PCT/ US 96/02890 Foreign Counterpart of US Patent 5,546,452.

International Search Report PCT/US 91/08475.

IP Telephony with TAPI 3.0, Microsoft Windows 2000 Server, Microsoft, White Paper, 1999 Microsoft Corporation, Redmond, WA.

* cited by examiner

CALL MANAGEMENT IMPLEMENTED USING CALL ROUTING ENGINE

CROSS REFERENCE TO RELATED APPLICATIONS

The present application is a continuation of U.S. patent application Ser. No. 09/619,875, filed Jul. 20, 2000, now U.S. Pat. No. 6,807,269.

BACKGROUND OF THE INVENTION

1. Field of the Invention

The present invention relates generally to call management using a routing engine in a communications system, and more specifically, to call management techniques that involve processing by the engine after an initial call connection has been established in the system.

2. Brief Description of Related Prior Art

Systems for managing and routing calls through public and/or private communications networks are known in the art. Conventional automatic call distribution (ACD) systems route calls to agents in telemarketing and service inquiry centers, and provide limited real-time call management and reporting capabilities. A typical ACD system will monitor the status of the agent and, when an incoming call is received, selects the agent to handle a particular service request. Reporting and performance data from the agents are also generated by the ACD.

One particular type of scheme for distributing calls to agents is disclosed in Frauenthal et al., U.S. Pat. No. 4,737,983. According to Frauenthal et al., data representing the present call congestion of each of the ACD systems is accumulated in a data base. Using the data in the data base, the percentage of calls made to the ACD systems, as a group, is determined. The information is then used to generate call routing information. When a new call is made to the central office, the routing information is queried to determine which of the ACD systems is to receive the call, so as to balance the call traffic load across the ACD systems.

Another call management and distribution scheme is provided in Gechter et al., U.S. Pat. No. 5,036,535. This patent discloses a system for automatically distributing telephone calls placed over a network to one of a plurality of agent stations connected to the network via service interfaces, and providing status messages to the network. Gechter et al.'s disclosed system includes means for receiving the agent status messages and call arrival messages from the network, which means are connected via a network service interface to the network. Routing means responsive to the receiving means is provided for generating a routing signal provided to the network to connect the incoming call to an agent station through the network. In the system disclosed in Gechter et al., when an incoming call is made to the call router, it decides which agent station should receive the call, establishes a call with that agent station, and then transfers the original call onto the second call to connect the incoming caller directly to the agent station and then drops out of the connection (See, Gechter et al., column 11, lines 45–51).

Other prior art call management, routing, and distribution techniques are disclosed in Andrews et al., U.S. Pat. No. 5,873,130, which is assigned to the assignee of the subject application. This patent discloses a communications system and method for automatically making telephone routing decisions with global authority based upon information gathered in real time from the entire communications system and global optimization criteria. The entirety of the disclosure of the Andrews et al. patent is incorporated herein by reference.

In conventional systems that implement the call processing techniques disclosed in the Andrews et al. patent, it is often desirable to facilitate certain "post-routing" call processing features. A call is considered to undergo "post-routing" processing when, after the call has already been initially routed to an initial destination, the same call is again processed such that another destination or called device becomes involved in the call. Examples of conventional "post-routing" call processing features include, e.g., the ability to transfer a call, initially routed to a first called device (e.g., an ACD and/or interactive voice response (IVR) unit-containing system) via a public network, from the first called device to a second, remote called device, the ability to conference the calling device and/or the first called device with the second called device, etc. Such post-routing call processing may be initiated by the first called device, and when the called devices comprise ACD or IVR systems typically is facilitated by one or more telecommunications inter-site tie-lines connecting the first and second called devices.

Unfortunately, the use of such inter-site tie-lines increases the cost and complexity of implementing post-routing call processing features. Also unfortunately, when such inter-site tie-lines are used to facilitate such post-routing call processing features, telecommunications resources of the first called device typically must be used to maintain the call connection to the second called device, even when the type of post-routing call processing feature being executed does not require information exchange between the calling device and the first called device. Disadvantageously, this results in inefficient use of such telecommunications resources.

Other prior art communications systems utilize conventional integrated services data network (ISDN) and American Telephone and Telegraph (AT&T) technologies to carry out such post-routing call processing features, without using such inter-site tie-lines. However, such prior art communications systems do not provide means for centralized control of the public network and local switch resources. Disadvantageously, this undesirably increases the cost and complexity associated with implementing such post-routing call processing features in such systems.

Thus, it would be desirable to eliminate the need to use such inter-site tie-lines to facilitate post-routing call processing features, and to provide a mechanism that ensures that telecommunications resources of called devices are used more efficiently than in the prior art.

SUMMARY OF THE INVENTION

According to the present invention, call management techniques are provided that overcome the aforesaid and other disadvantages and drawbacks of the prior art. More specifically, in the techniques of the present invention, a public network is used in place of inter-site tie-lines between called devices, to facilitate implementation of conventional types of post-routing call processing features. Also in accordance with the present invention, one or more messages may be provided to one or more called devices after a call routing engine has taken action to initiate execution of a desired post-routing call processing feature by the network; the one or more called devices, in response to these messages, may control and reallocate their resources so as to more efficiently make use thereof than in the prior art. Additionally, in the present invention, the public network and local switch resources are centrally controlled so as to facilitate implementation of such call processing features, and local switch resources and the public network may be thought of as a single virtual switch for purposes of implementing such features.

In one embodiment of a call management method according to the present invention, the engine receives a first call management message that causes the engine to initiate establishment of a first connection, via a public network (e.g., a long distance carrier network), between one called device, and either or both of another called device and a calling device. The engine receives the message at a time when the calling device is already connected to the another device via the public network. The first message is initiated by the another called device and includes two or more information fields. The engine, in response to the received message, issues a second call management message that initiates establishment by the network of the first connection, and also issues a third call management message to the another called device that indicates that the first message has been processed and acted upon.

The method may include selection by the engine of a destination label (e.g., corresponding to a destination dialed number identification service (DNIS) or trunk identification number) in the network that corresponds to the one called device, and specification by the engine of the label in the second call management message.

Alternatively, the network may place, in accordance with the second call management message, the calling device in a hold status and establish the first connection such that the first connection is between the another called device and the one called device, via the network. In this alternative embodiment, the first call management message may request that alternating connections be made, via the public network, between the another called device and the one called device, and between the another called device and the calling device, respectively. In this alternative embodiment, a subsequent call management message may request that the another called device be disconnected from the calling device. In a variation of this alternative method, the subsequent call management message may request that the one called device be connected to the calling device via the network and that the another called device be disconnected from the calling device.

The one and another called devices may each comprise a respective voice response unit (VRU) connected to the public network and/or a respective ACD system connected to the network. The calling device may be external to the VRU and ACD systems comprised in the called devices.

Advantageously, the techniques of the present invention eliminate the need to use inter-site tie-lines to implement conventional post-routing call processing features, thereby reducing the cost and complexity of implementing such features, according to the present invention, compared to the prior art. Also advantageously, the techniques of the present invention permit the public network to be centrally controlled so as to implement such features, and also permit local switching resources and the public network to be thought of as a single virtual switch for purposes of implementing such features.

It will be appreciated by those skilled in the art that although the following Detailed Description will proceed with reference being made to illustrative embodiments and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

Other features and advantages of the present invention will become apparent as the following Detailed Description proceeds, and upon reference to the Drawings, wherein like numerals depict like parts, and wherein.

DETAILED DESCRIPTION OF ILLUSTRATIVE EMBODIMENTS

Figure 1:
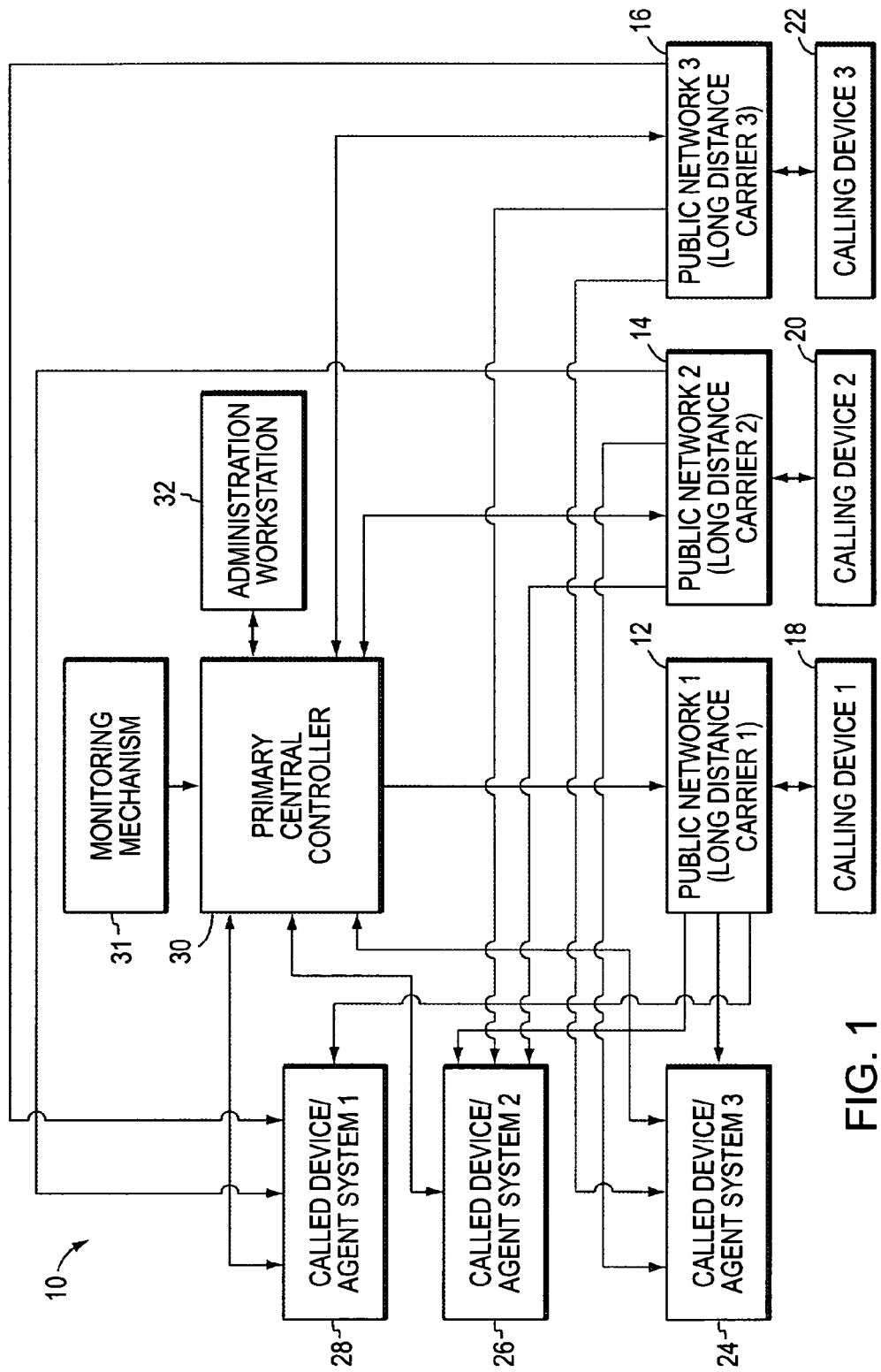
FIG. 1 is a functional block diagram of one embodiment of a communications system wherein the present invention may be practiced to advantage.

FIG. 1 is an architectural-level block diagram illustrating functional components of a communications system 10 wherein the present invention may be practiced. System 10 includes a plurality of agent systems 24, 26, 28 connected to a primary central controller 30 and a plurality of public telephone and/or long distance carrier networks (e.g., British Telecom, Energis, France Telecom, Cable and Wireless, MCI, Sprint, AT&T) 12, 14, 16. Calling devices 18, 20, 22 place calls to called devices (i.e., agent systems 24, 26, 28) via public networks 12, 14, 16. As will be explained more fully below, primary central controller 30 generates command messages for controlling routing and distribution of calls through the long distance carriers to and from the agent systems, and through the agent systems themselves to and from individual workgroups, customer agents and/or caller services, based upon requested service messages (e.g., telephone numbers and/or other information and messages supplied from the calling devices and public networks, and/or call management request messages from the called devices), status messages (i.e., availability of resources for use by callers, loading of system resources, etc.) supplied by the agent systems, and user-generated call routing control scripts) stored in controller 30. Administration workstation 32 permits user access and control of the system 10 by, for example, permitting generation and modification of system configuration data, call routing scripts, etc. stored in controller 30. Monitoring and diagnostic mechanism 31 monitors the various elements of the system (i.e., the agent systems 24, 26, 28, administration means 32, etc.) to determine whether these elements are functioning properly. If a malfunction is detected, that fact is signaled to the central controller 30, so that it can undertake appropriate action to correct and/or eliminate the malfunction and/or any resulting problems to the system 10 from the malfunction.

Although not shown in the Figures, each of the conventional long distance carriers 12, 14, 16 includes a long distance control network (e.g., AT&T's Signaling System 7 (SS7) control network, MCI's TCP/IP-based control network, Sprint's X.25-based control network and/or foreign telecommunication's CCITT SS7-based control network) and local exchange carriers. The long distance control networks control routing of calls through the long distance network serviced by the exchange carriers. When a long distance call request is initially received from a calling device (e.g., a caller at a calling device dials a long distance telephone number) by the exchange carrier, it forwards the call request to the long distance network, which routes the call to its intended destination. In system 10, when the long distance control network receives a request for long distance connection to one of the agents in the agent systems' workgroups or caller services, the long distance control network forwards the long distance routing request to the central controller 30. As will be described more fully below, central controller 30 then processes the request and controls the system 10 to route the call to a destination in accordance with call routing control scripts executed by the controller 30. The system 10 accomplishes call routing by, inter alia, translating the routing request message into a route response or command message that addresses the desired destination. System 10 also supports routing of calls across local exchange carriers and international PTT's by utilizing substantially the same call control and distribution techniques discussed above. As is known to those skilled in the art, call destinations are commonly termed "labels." A "label" may be or specify e.g., a particular destination telephone number, trunk group, or DNIS number.

Figure 2:
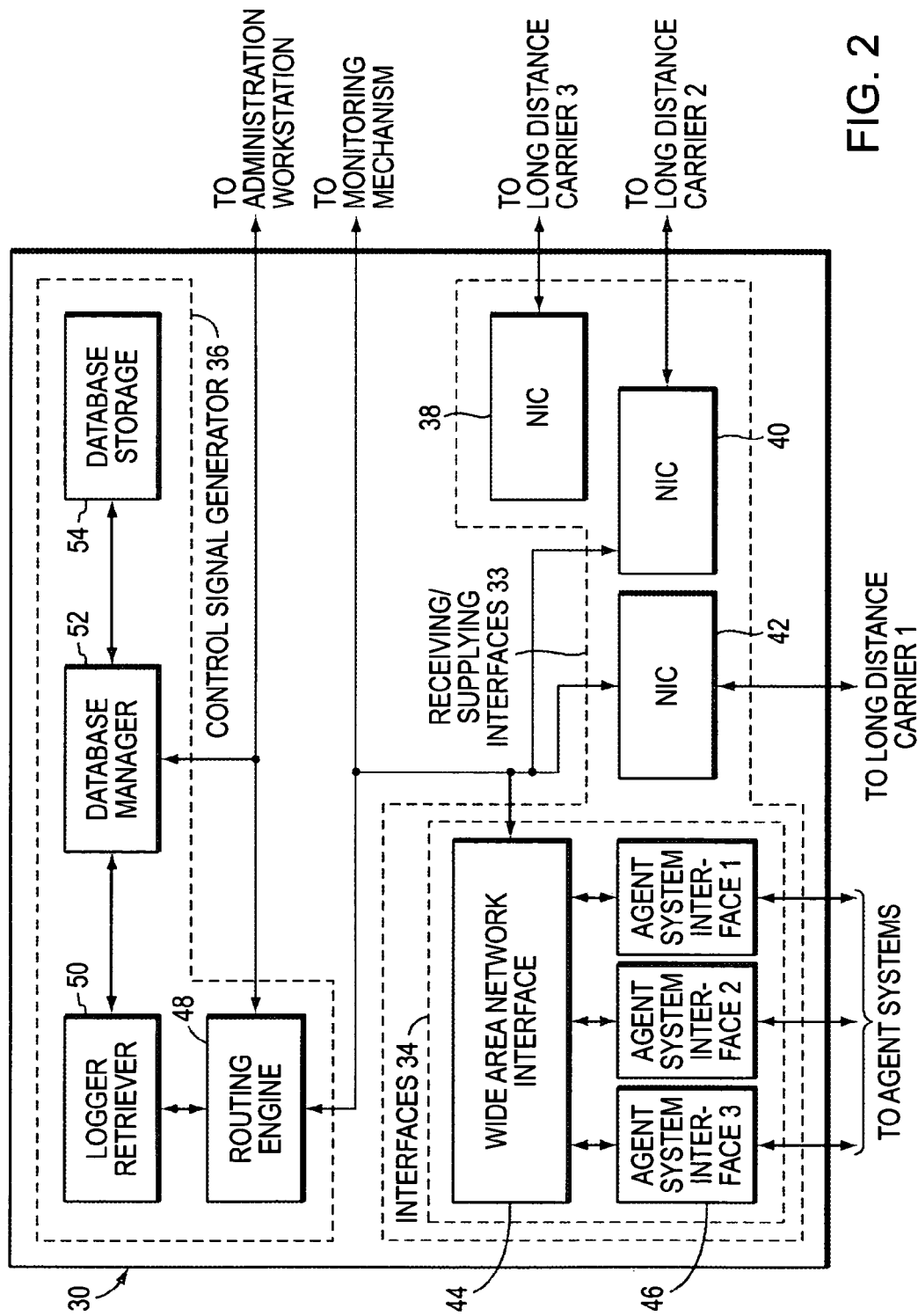
FIG. 2 is a functional block diagram of the primary central controller of the system of FIG. 1.

FIG. 2 is a schematic block diagram illustrating functional components of the central controller 30. Controller 30 includes interfaces 33 for receiving status and requested service messages, and for supplying command messages generating by the controller 30 to the public networks and the agent systems. Interfaces 33 include long distance carrier network interface controllers (NICs) 38, 40, 42 that interface the controller 30 to the public networks 12, 14, 16, respectively. Each of the NICs 38, 40, 42 is appropriately constructed to permit transmission of command messages to and receipt of requested service and other messages from the respective network to which it is connected. For example, if NIC 42 is connected to an AT&T network, then it is appropriately constructed to permit transfer of command and requested service messages between the controller 30 and the SS7 network; additionally, the NIC 42 may be constructed to receive and process from the SS7 network confirmation messages that confirm that command messages provided to the SS7 are proper for the SS7 network and have or are being acted upon by the SS7 network. Other types of carriers must also be similarly accommodated by appropriately constructing the other NICs 40, 38 to permit exchange of such messages between these networks and the controller 30.

Interfaces 33 also include agent interfaces 34 for interfacing the controller 30 to the agent systems 24, 26, 28. Interfaces 34 include agent system interfaces 46 connected to a conventional wide area network interface 44 which connects the controller 30 to the interfaces 34 so as to permit transmission of status and other messages from the agent systems to the routing engine 48, and to permit transmission of command and other messages to the agent systems 24, 26, 28. It should be understood that the particular types of interfaces 46 used will depend upon the particular constructions of the agent systems, the wide area network (not shown) that connects the controller to the agent systems, and the controller itself. Interface 44 may be adapted for use with a conventional TCP/IP (Transmission Control Protocol/Internet Protocol) network (not shown), which connects the controller to the agent systems), although alternatively, interface 44 may be constructed for use with networks that use other network protocols.

Control signal generator 36 is connected to the interfaces 33, monitoring mechanism 31, and administrative workstation 32. Control signal generator 36 comprises routing engine 48, database logger/retrieving engine 50, database manager 52, and database 54. Routing engine 48 determines how to route calls in the system 10 (i.e., through the public networks to the agent systems, and in the agent systems themselves), and transmits this routing information (e.g., in the form of appropriate command messages) that address the desired end-termination (e.g., an agent station or workstation in a workgroup/caller service in the system) to interfaces 33, 34 for transmission to the agent systems and long distance control networks, respectively. In order to determine how to route calls in the system, routing engine 48 takes into consideration real-time requested service messages supplied to it by the interfaces 33, system configuration data 202 and historical (i.e., previously stored) requested service data derived from requested service messages and status messages 204 retrieved by logger/retriever 50 at the command of the routing engine 48 from the system's historical database (comprising database manager 52 and storage mechanism 54), real-time status messages from the agent systems supplied to it from the interfaces 34, information from the monitoring mechanism 31 concerning what components (if any) of the system are currently unavailable because they are malfunctioning or inoperative, and routing optimization criteria and/or rules and commands in the form of call routing control scripts 200 generated by the administration workstation and stored in database 54. Routine engine 48 uses this data to determine the manner in which to route calls in the system. After making its decision on how best to route a particular call, generating appropriate command messages to implement this decision, and transmitting the command messages to the interfaces 33 and 34, routing engine 48 instructs logging engine 50 to store the real-time information presented above in the database 54 for use in determining how to route later calls. Logging engine 50 in turn, commands database manager 52 to store this information in database 54.

Figure 3:
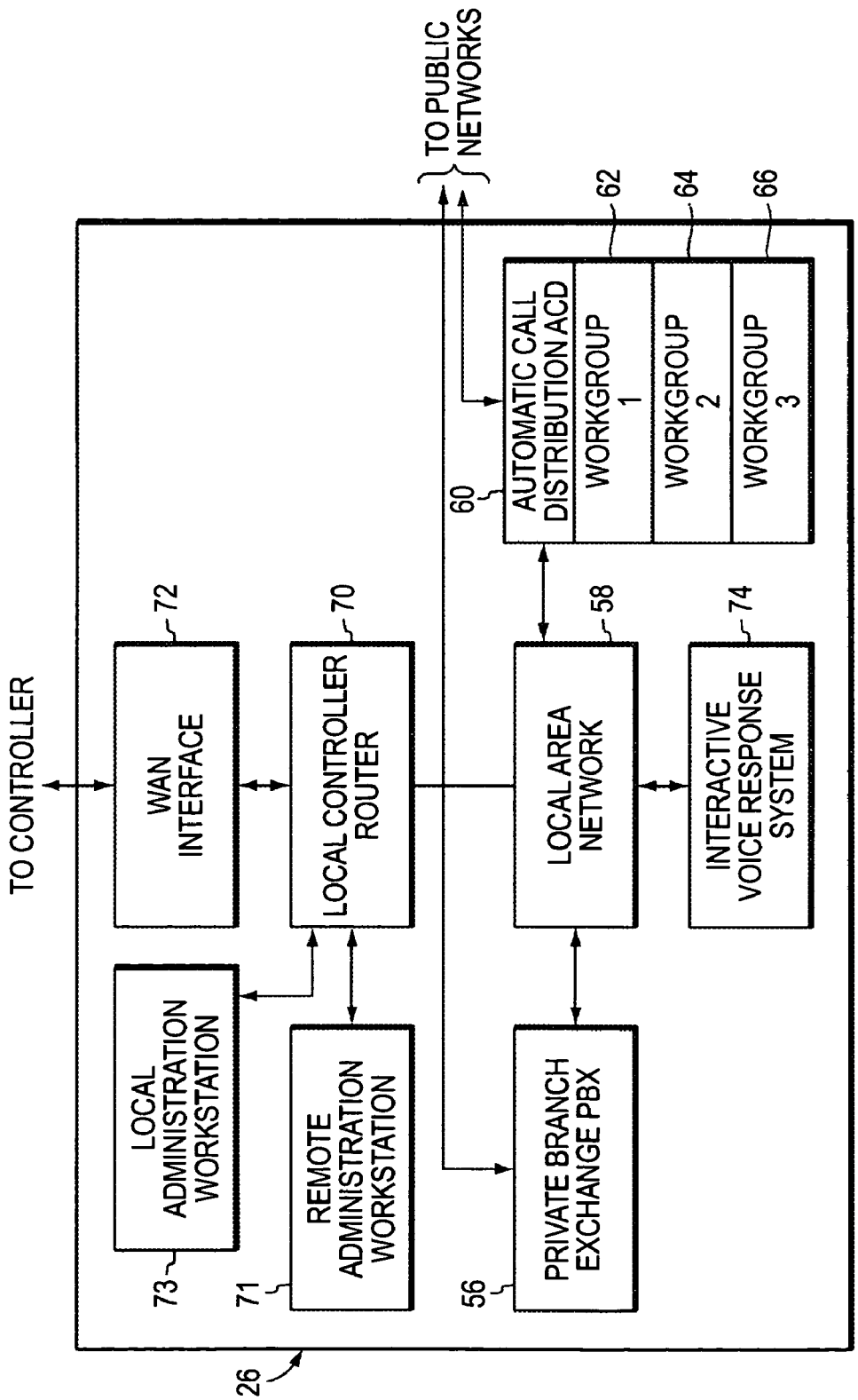
FIG. 3 is a functional block diagram of an agent system in the system of FIG. 1.

FIG. 3 is a functional block diagram of an agent system 26. Agent system 26 comprises an interface 72 for interfacing the agent system's local controller/router 70 to the controller's wide area network interface 44, so as to permit transfer of command and other messages from controller 30 to local controller 70 and status and other messages from the local controller 70 to controller 30. In response to command and other messages received by local router 70 from controller 30, local router 70 issues commands to the ACD/IVR, or PBX system causing public network interfaces (not shown) in the ACD, PBX or IVR to connect and disconnect calls received thereat from the public networks to and from appropriate caller services (e.g. interactive voice response system 74) or individual agents (e.g. connected to private branch exchange (PBX) 56 or ACD 60). It should be noted that the particular type and number of caller services and agent workgroups shown in FIG. 3 are merely for illustrative purposes and may vary. Local router 70 issues commands via the conventional local network 58 to the caller service or individual agent system in the workgroup to which the call is connected, as to how the individual agent or caller service is to distribute or process the call. For example, depending upon the command messages transmitted by the controller 30 to controller 70, controller 70 may instruct the call to be forwarded directly to the interactive voice response system 74 which is connected as an answering resource to ACD 60, and instruct the interactive voice response system to store information from the call for later retrieval and transmission to a workstation (not shown) connected to the PBX 56, or to connect the call to the ACD 60 and instruct the ACD to forward the call to one of its workgroups 62, 64, 66. Of course, it will be appreciated that if appropriately modified, the network interfaces may be comprised within the public networks or may comprise separate, stand-alone interfaces distinct from the agent systems. Likewise, if the PBX, IVR, and/or ACD are appropriately modified so as to include other of the various functional components of the agents (e.g. router 70), they may be eliminated, or comprised as separate functional components from the agent system. Local controller 70 also queries the individual agents and caller services for status information (e.g. whether they are active or busy, what resources are available for use by callers, etc.), gathers this status information via the local network 58, and transmits this information to the central controller 30 via interface 72 for use in the central controller's routing decisions.

Agent system 26 may also comprise local administration workstation 73 for permitting user control of the local router 70, and remote administration workstation 71 for permitting remote control of central controller 30. Both administration workstations 73, 71 are of similar construction to administration workstation 32. Local administration workstation 73 may be limited in its ability to control local router 70 (i.e., only to control matters not being controlled by central controller 30). Likewise, remote administration workstation 71 may be limited in its authority over system 10 such that administration workstation 32 may override commands issued by administration workstation 71.

Figure 4:
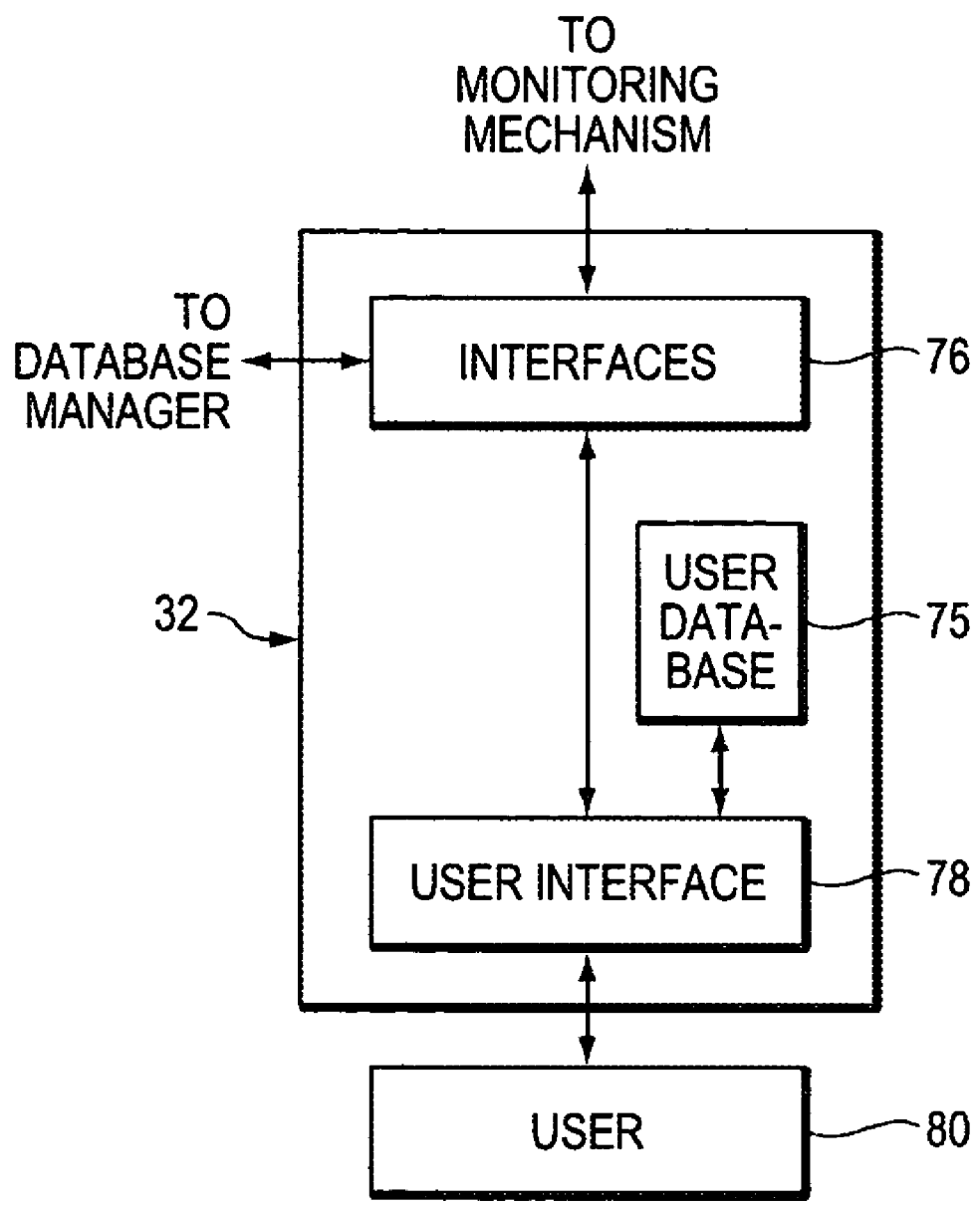
FIG. 4 is a functional block diagram of an administrative workstation used in the system of FIG. 1.
Figure 5:
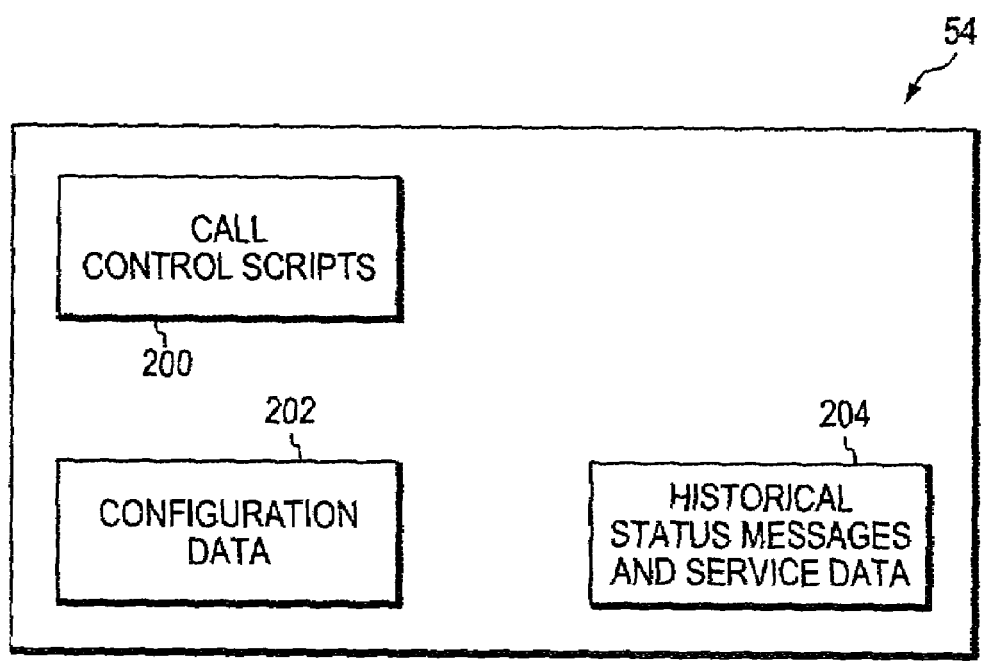
FIG. 5 is a schematic block diagram illustrating data structures in the database shown in FIG. 4.

FIG. 4 is a functional block diagram of administration workstation 32. Workstation 32 may comprise a user input/output interface 78 connected to central controller interface 76. User interface 78 may comprise a graphical user interface for permitting a human user 81 to generate, edit, and store call control routing scripts 200, system configuration data 202, etc. in the database 54 of the central controller 30. The database interface 76 is adapted to change the user's graphically input data into a form usable by the central controller in the central controller's database 54. Administration workstation 32 comprises a user-accessible database 75 for storing real-time information and configuration information and for permitting such information to be communicated to a human user via the user interface 78. Also, administration workstation 32 permits a user to monitor various system activities and current system information, such as, call routing, system configuration, etc.

The above-presented functional components (with the exception of networks 12, 14, and 16) of system 10 may be embodied as, or comprise one or more distributed computer program processes executing in a plurality of computer nodes; each of these nodes may include computer-readable memory for storing software programs, algorithms, and data structures associated with, and for carrying out, the inventive techniques, and related and other techniques and methods described herein as being carried out by or implemented in system 10. In addition, each of these nodes may further include a processor (e.g., an Intel 80x86 processor) for executing these software programs and algorithms, and for manipulating the stored data structures, to enable the nodes to carry out these methods and techniques in system 10. Additionally, the nodes may be provisioned with such networking hardware and software (e.g., including computer networking and telephonic communications hardware and software) as is needed to enable performance of the stated functionality.

It should be noted that the functional components of the system 10 may vary depending upon particular functional and operational requirements. For example, the existing components of system 10 may be modified to incorporate the functionality of, or the system 10 may be modified to include, fault-tolerance-related functional components (e.g., a redundant central controller), components related to processing of Internet calls, and/or call-queuing-related components described in the aforesaid Andrews et al. patent (i.e., U.S. Pat. No. 5,873,130). Accordingly, it should be appreciated that the present invention may be practiced in systems other than system 10 (e.g., in systems having different and/or additional functional components like those described in the aforesaid Andrews et al. patent, and other communications systems).

Figure 6:
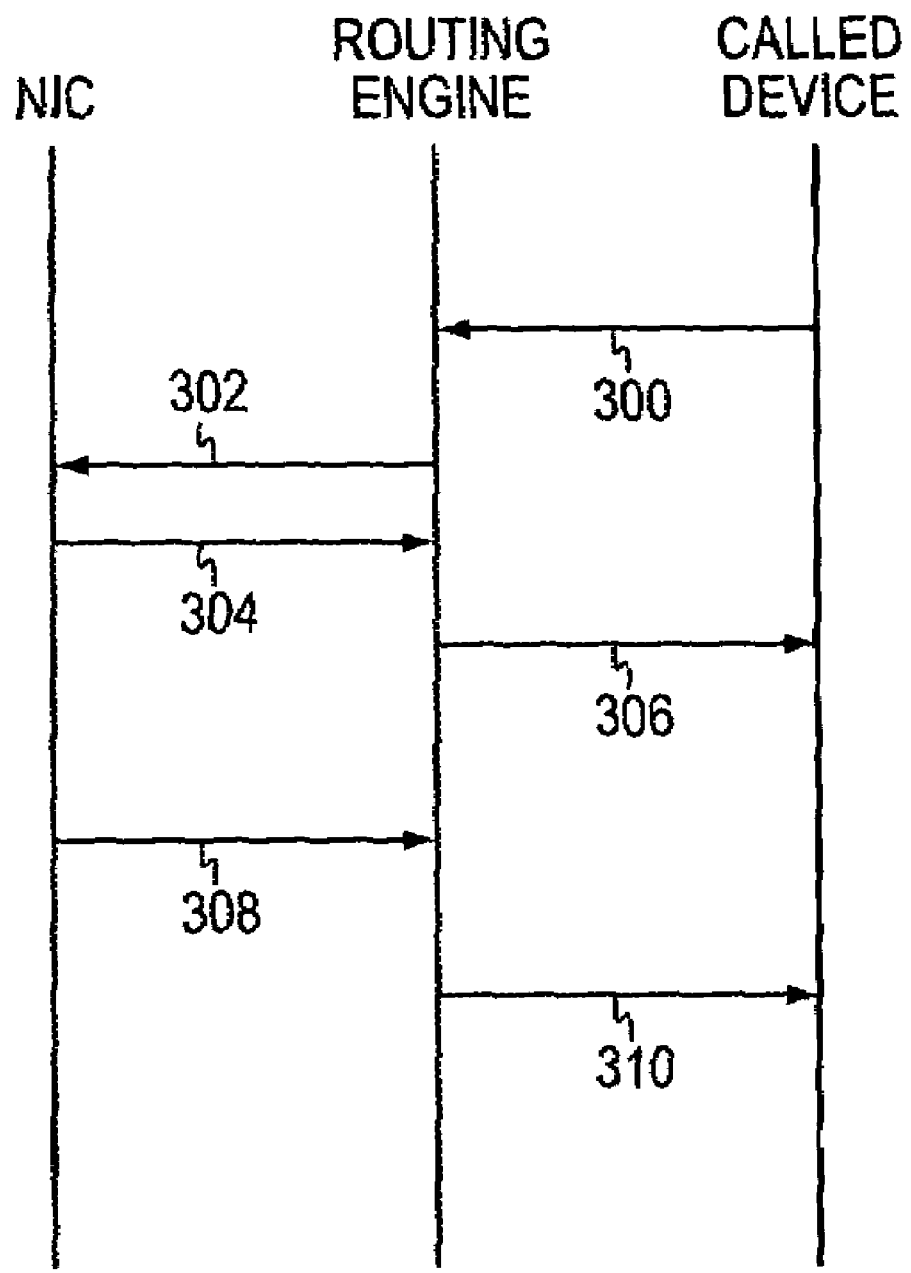
FIG. 6 is a schematic diagram illustrating messages exchanged in the system of FIG. 1 in accordance with an embodiment of one call management technique according to the invention.
Figure 7:
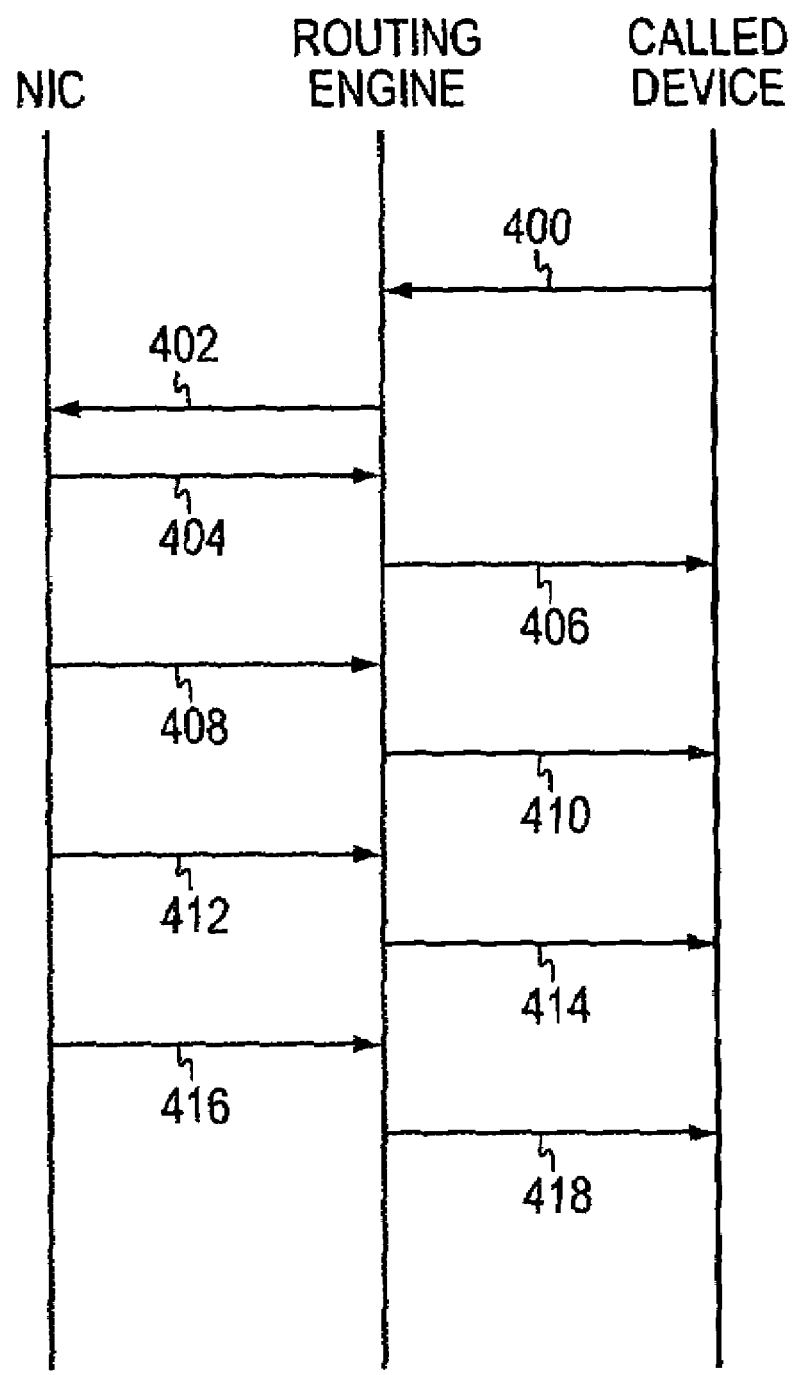
FIG. 7 is a schematic diagram illustrating messages exchanged in the system of FIG. 1 in accordance with an embodiment of another call management technique according to the invention.
Figure 8:
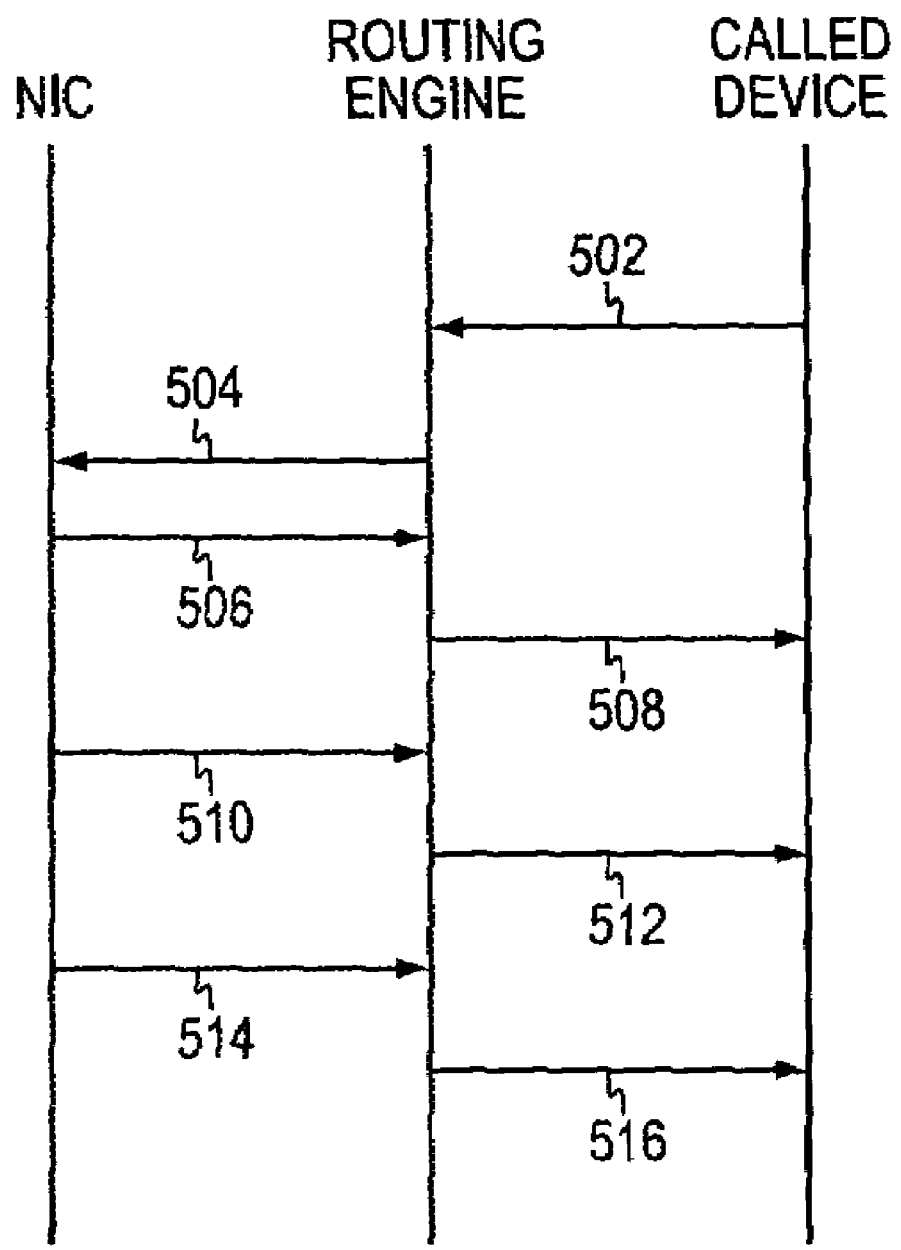
FIG. 8 is a schematic diagram illustrating messages exchanged in the system of FIG. 1 in accordance with an embodiment of another call management technique according to the invention.

Turning to FIGS. 6–8, illustrative embodiments of inventive post-routing call management/processing techniques used in the communication system 10 of FIG. 1 will now be described. Each of FIGS. 6–8 illustrates messages used to implement such embodiments. It should be understood that the description of each of these embodiments will proceed with the assumption that the call that is to undergo post-routing call processing has already been initially routed from a calling device (e.g., device 18) to a called device (e.g., device 26) via one of the public networks (e.g., network 12) and an existing call connection exists between the two devices 18, 26 through that network 12. Depending upon the technique being described, this existing call connection may have been made to e.g., an individual agent device (e.g., a not shown agent telephone station or computer-telephony-integration (CTI) workstation comprised in one of the workgroups, or an IVR system of the device 26) of the called device 26, and may have been established based upon command messages issued from the routing engine 48 to the public network 12 and called device 26.

FIG. 6 illustrates messages used to implement one embodiment of a call transfer technique that may be executed by the system 10. The technique of FIG. 6 commences with the generation and issuance by the called device 26 to the routing engine 48 of a call transfer request message 300. More specifically, the message 300 may be generated by the local router 70 of the device 26 in response to an initial transfer request message issued to the local router 70 by the individual agent station or CTI workstation to which the call was initially routed, and once generated by the local router 70 may be supplied to the routing engine 48 via the interfaces 34, 72.

In essence, message 300 requests that the routing engine 48 issue a command message 302 for initiating transfer to another called device (e.g., agent system 28) of the existing call that is presently connected to the device 26. More specifically, message 300 may request that the routing engine 48 issue a command message 302 that initiates the transfer, via the network 12 through which the existing call connection has been established, from the device 26 of the existing call to e.g., an agent station or CTI workstation of one of the workgroups, or IVR system comprised in the second agent system 28.

In response to receipt of the message 300, the routing engine 48 selects a destination label in the public network 12 that is appropriate for the desired transfer destination (i.e., as requested in the message 300), and issues a call transfer command message 302 that addresses that destination label to the NIC 42 that is associated with the public network 12 through which the initial call connection was established. Based upon the message 302, the NIC 42 generates and issues to the public network 12 a network command message (not shown), and prior to issuing the network command message, also generates and issues to the routing engine 48 an initial network transfer confirmation message 304 that indicates that the NIC 42 has accepted the message 302 and is taking action to implement the message 302.

When routing engine 48 receives the message 304, engine 48 forwards a copy 306 of the message 304 to the local router 70 of first called device 26. In response to receipt of the message 304, local router 70 optionally command the called device 26 to terminate its call connection to the calling device 70, and to free the telecommunications resources (e.g., including the agent station or workstation, or IVR system) of the called device 26 that were previously involved in the initial connection of device 26 to the calling device 18 for use in other call processing.

The network command message issued by the NIC 42 to the public network 12 may cause, if the aforesaid command was not issued by the router 70, the public network 12 to disconnect the calling device 18 from the called device 26 and to establish a new call connection, via the public network 12, to the destination label addressed in the message 302, while ensuring that the calling device 18 does not become disconnected from the public network 12. After the NIC 42 issues the network command message, the NIC 42 issues to the routing engine 48 a message 308 that indicates that the new call connection is being established through the public network 12. The routing engine 48 may issue to the local router 70 of the second called device 28 other appropriate message(s) to cause the called device 28 to perform the necessary operations to receive and process the new call connection at the destination label.

The routing engine 48 forwards a copy 310 of the message 308 to the local router 70 of the device 26. In response to receipt of the message 310, the local router 70 of the device updates its historical records concerning its processing of the call, and terminates its operations involved in such processing.

Messages 300 and 302 may each contain a plurality of information fields for containing respective data values and/or structures that identify and/or specify, inter alia, the type of post-routing call processing being requested or commanded (e.g., whether such processing involves call transfer, conferencing, etc.), respectively, and the initially-established call connection and telecommunications resources of the calling 18 and called devices 26, 28 and public network(s) involved in that processing. The data specified in these messages may also include call context-related information. Similarly, the other messages 304, 306, 308, 310 may each contain some or all of these data values, depending upon the particular implementation of this technique in system 10.

More specifically, for example, message 300 may contain at least the following data structures or values: NICCallID, PGCallID, OperationCode, OperationFlags, CalledPartyNumber, CallingPartyNumber, CallerEnteredDigits, CallAtVRU, and call-context related data, which identify and/or specify, respectively, the original routing client's call-control related data, the called routing client's call-control related data, the type of post-routing call processing being requested or commanded, the types of cooperative capabilities that are available in the post-routing call processing (e.g., whether DTMF, etc. capabilities are available), the telephone number to which the original call was made, the telephone number of the calling device, any caller-entered digits (e.g., as a result of interaction with a voice response unit in system 10), whether the message 300 is being sent from a voice response unit, and additional call-related data provided by the routing client engine and/or CTI applications. The call-control related information may identify and/or specify at least, e.g., a physical controller of a routing client associated with the call-control related information, the routing client itself, the identity of the call and the initial call connection between the calling device and the first called device as known to the routing client, and a sequence number identifying the respective call connection segment/leg associated with the call-control related information. Message 302 addresses a destination label in network 12 that is appropriate for the given post-routing call processing being requested by message 300, and may contain at least, e.g., data structures or values such as, the NICCallID, PGCallID, OperationCode, and OperationFlags data structures or values. In addition, the message 302 may contain a Boolean variable that specifies whether additional post-routing call processing features may be invoked after processing of the subject post-routing call processing feature being requested by the message 302.

Turning now to FIG. 7, messages used to implement an embodiment of a another inventive post-routing call processing technique will be described. The processing technique whose messages are illustrated in FIG. 7 permit a "consultative" connection to be established via one of the public networks 12 between the first called device 26 and the second called device 28 (e.g., to permit exchange of information between agent stations and/or CTI workstations comprised in the devices 26, 28 concerning the previously-established call made to the device 26), while the previously-established call connection is held by the public network through which it is being made, to enable later reconnection or transfer of the previously-established call to the first or second device 26, 28, respectively, or conferencing together of the first and second devices and the calling device, via the public network, after such exchange is completed.

This processing technique commences with the generation and transmission of a consultative call management request message 400 from the local router 70 of the first called device 26 to the routing engine 48. The issuance of the message 400 from the local router 70 may be initiated by e.g., a request message (not shown) from the agent station or workstation of the device 26 that is involved with the previously-established call to the device 26. The message 400 essentially requests that a consultative type of call connection be established, via network 12, between an agent station or workstation of the is device 26 that is currently involved with the previously-established call, and another agent station or workstation in a second called device 28. In response to receipt of the message 400, the engine 48 generates and issues to the NIC 42 associated with the network 12 a call management command message 402 that commands the NIC 42 to generate and issue to the public network 12 a network command message (not shown) for establishing this type consultative type of call connection. In response to receipt of the message 402, the NIC 42 generates and supplies to the routing engine 48 a message 404 that confirms that the NIC 42 has received and is acting upon the command message 402.

The network command message issued to the network 12 causes the network 12 to put the initial call placed by the calling device 18 (i.e., between the calling device 18 and the first called device 26) into a hold status in the network 12, and to initiate establishment of a new call connection, via the network 12, between the agent station or workstation of the first called device 26 and the agent station or workstation of the second called device 28 specified in the message 402. Messages 408 and 412 are issued by the NIC 42 to the routing engine 48, after the initial call has been placed into the hold status and the establishment of the new call connection has been initiated, respectively. Copies 406, 410, and 414 of messages 404, 408, and 412 are issued by the routing engine 48 to the local router 70 of the first called device 26 to permit the first called device to track the progress of processing by the system 10 of the request message 400, and to appropriately control and allocate the telecommunications resources of the device 26 based upon such progress. The routing engine 48 may also provide messages similar to messages 406, 410, and 414 to the local router 70 of the second called device device 28 to permit local router 70 of the device 28 to appropriately control and allocate the telecommunications resources of device 28 based upon such progress, and to permit the new call connection to be established, via the network 12, between the devices 26, 28. After this new call connection has been established via the network 12, the NIC 42 issues to the routing engine 48 a message 416 confirming same. The routing engine 48 then forwards a copy 418 of the message 416 to the local router 70 of the first called device 26, and thereafter, exchange of information between the two devices 26, 28 may be carried out via the new call connection established via network 12. After the new call connection has terminated (e.g., as the result of on-hook condition at the second called device that terminates the new call connection), the held connection may be retrieved and information exchange between the calling device 18 and the first called device 26 may proceed.

Alternatively, the first called device 26 may issue a further request message (not shown) to the routing engine 48, that when received by the routing engine 48 may be forwarded by the routing engine 48 to the NIC 42. This further request message may request that the held call be transferred to the second called device 28. This transfer process may proceed in a fashion that is similar to the transfer process described above in connection with FIG. 6.

Further alternatively, the further request message may request that the first and second called devices and the calling device be conferenced together via the network 12 such that they are able to simultaneously exchange information among themselves. In response to the receipt of such a request message, the NIC 42 may command the public network 12 to execute the processing being requested, and when received by the public network 12, the public network 12 may execute such command. The NIC 42 may provide messages to the routing engine 48 confirming that the NIC has acted upon the request message, and also indicating the stages in the execution by the network 12 of the processing requested by such message. Copies of such confirmation and indicating messages may be forwarded by the routing engine 48 to the first called device 26, and messages similar to these copies may be forwarded by the routing engine to the second called device 28, to permit the devices 26, 28 to appropriately control and allocate their respective telecommunications resources based thereon. Once conferenced together, the first called device may issue a yet further request message (not shown) to the NIC 42) via the routing engine 48) for causing the second called device to be dropped from the conference, and once received by the NIC 42, the system 10 may process this message in the manner that the further request message is processed.

Messages 400 and 402 may each contain a plurality of information fields for containing data values, inter alia, of the type contained in messages 300 and 302. Additionally, messages 404, 406, 408, 410, 412, 414, 416 and 418 may each contain some or all of these data values, depending upon the particular implementation of this technique in system 10.

Turning to FIG. 8, one embodiment of yet another inventive post-routing call management/processing technique will now be described. FIG. 8 illustrates messages that are used to implement an inventive technique wherein post-routing call connections alternate between the first called device 26 and the calling device 18, and the first called device 26 and the second called device 28, respectively. That is, in the technique of FIG. 8, after a call is initially routed from the calling device 18 through a public network 12 to an agent station or workstation in a workgroup of a first called device 26, the initial call connection (i.e., between the calling device 18 and the first called device 26 via the public network 12) is first placed in a hold status, and thereafter, a second call connection is established, via the public network, between the agent station or workstation of the first called device 26 to which the initial call connection was established, and another agent station or workstation in a workgroup of a second called device 28, as in the consultative processing of FIG. 7. Thereafter, the second call connection is placed into a hold status, and the initial connection is returned to an active status (i.e., non-held status). Thereafter, the first and second call connections repeatedly alternate between held and active status, with the first and second call connections always have complementary statuses (i.e., when the first call connection is in active status, the second call connection is always in a held status, and vice versa), until termination of either or both of the first and second call connections. Advantageously, this permits the calling device 18 and first called device 26, and first called device 26 and second called device 28, respectively, to alternately exchange information with each other.

More specifically, the technique of FIG. 8 commences with call management request message 502 being generated and transmitted by the local router 70 of the first called device 26 to the routing engine 48. The generation and transmission of the message 502 may be initiated by a request message (not shown) transmitted to the local router 70 of the device 26 by an agent station or workstation in a workgroup of the device 26. In essence, the message 502 requests that the system 10 initiate the above-described type of "alternating" hold/active status call connection processing of the call that is currently connected to that agent station or workstation of device 26.

In response to receipt of the message 502, the engine 48 generates and transmits to the NIC 42 a call management request message 504 that commands that the NIC 42 initiate such alternating call connection processing. Alternatively, depending upon the particular implementation of this technique in system 10, the engine 48 may instead simply copy the message 502 and forward the copy to the NIC 42. In response to receipt of the message 504 (or in the alternative arrangement, the copy thereof), the NIC 42 generates and transmits to the public network 12 a network command message (not shown) that causes the public network 12 both to place the existing call connection, via the network 12, between the agent station or workstation of the first called device 26 that requested such processing and the calling device 18, into a hold status, and to establish a second connection, via the network 12, to the second called device 28. After transmitting the network command message to the public network 12, the NIC 42 generates and transmits to the routing engine 48 a message 506 that confirms that the NIC 42 has commanded the network 12 to carry out the processing requested by the message 502. The engine 48 transmits a copy 508 of the message 506 to the device 26, and may also transmit a message (not shown) that is similar to message 506 to the second called device 28 to permit the devices 26, 28 to track the stage of the processing requested by the message 502 and to appropriately control and allocate their respective telecommunications resources based thereon.

Thereafter, the network 12 periodically repeatedly toggles the holding statuses of the first and second connections (i.e., the initially-established connection between the first called device 26 and calling device 18, and the second established connection between the first called device and the second called device, respectively), such that the second called device of the second connection is placed into a holding status, and the calling device of the first connection is actively connected to the device 26, and vice versa. The NIC 42 provides to the routing engine 48 messages 510, 514 that confirm changes in these holding statuses (i.e., message 510 may confirm that the second called device 28 is being placed on hold and message 514 may confirm that the calling device 18 has been reconnected to the first called device 26). Additional such confirmation messages (not shown) may be provided by the NIC 42 to the routing engine 48 when additional changes in these holding statuses occur. Copies 512, 516 of messages 510, 514 (and any such additional messages, not shown) may be forwarded by the routing engine 48 to the local router 70 of the first called device 26, and similar messages thereto may also be forwarded by the routing engine 48 to the local router 70 of the second called device 28, in order to permit the devices 26, 28 to be able to track the evolution of the processing requested by the request message 502 and appropriately control and allocate their respective telecommunications resources based thereon.

The toggling of these holding statuses by the network 12 may cease either in response to the first or second connection being terminated (e.g., by an on-hook condition of the calling device 18), or as the result of an appropriate request message (not shown) being forwarded by the first called device 26 to the NIC 42 (via the routing engine 48). Such a message may request, e.g., that the toggling of the holding statuses cease, the second connection be terminated, and the first connection be made active once again (i.e., if the first connection is currently in a holding status). Alternatively, the message may request that the toggling of the holding statuses cease, and that the first and second called devices and the calling device be conferenced together via the network 12 such that they are able to simultaneously exchange information among themselves. In response to the receipt of such a request message, the NIC 42 may command the public network 12 to execute the processing being requested, and when received by the public network 12, the public network 12 may execute such command. The NIC 42 may provide messages to the routing engine 48 confirming that the NIC has acted upon the request message, and also indicating the stages in the execution by the network 12 of the processing requested by such message. Copies of such confirmation and indicating messages may be forwarded by the routing engine 48 to the first called device 26, and messages similar to these copies may be forwarded by the routing engine to the second called device 28, to permit the devices 26, 28 to appropriately control and allocate their respective telecommunications resources based thereon.

Messages 502 and 504 may each contain a plurality of information fields for containing data values, inter alia, of the type contained in messages 300 and 302. Additionally, messages 506, 508, 510, 512, 514, and 516 may each contain some or all of these data values, depending upon the particular implementation of this technique in system 10.

It should be understood that above-described embodiments are being presented herein as examples and that many variations and alternatives thereof are possible. Accordingly, the present invention should be viewed broadly as being defined only as set forth in the hereinafter appended claims.

The invention claimed is:

1. A call management method implemented using a call routing engine, the method comprising:
   receiving at the engine a first message for causing the engine to initiate establishment of a post-routing call processing of a call established through a public network between a calling device and a called device, the message initiated by the called device;
   issuing from the engine a second message for initiating the establishment through the public network of the post-routing call processing; and
   issuing from the engine a third message to the called device indicating processing of the first message.

2. The method as in claim 1, further comprising:
   establishing as the post-routing call processing a call between the calling device, the called device, and another called device.

3. The method as in claim 1, further comprising:
   establishing as the post-routing call processing a call between the calling device and another called device, and removing the called device from the call.

4. The method as in claim 1, further comprising:
   establishing as the post-routing call processing a call between the called device and another called device;
   placing the calling device in a hold status.

5. The method as in claim 4, further comprising:
   disconnecting the another called device;
   removing the calling device from the hold status; and
   re-establishing a call between the calling device and the called device.

6. The method as in claim 1, further comprising:
   controlling the public network by the call routing engine to establish the post-routing call processing.

7. The method as in claim 1, further comprising:
   having a voice response unit (VRU) connected to the public network, as the called device.

8. The method as in claim 1, further comprising:
   having an automatic call distribution system (ACD) connected to the public network, as the called device.

9. The method as in claim 1, further comprising:
   having the calling device external to a VRU, where the VRU includes the called device.

10. The method as in claim 1, further comprising:
    having the calling device external to a ACD, where the ACD includes the called device.

11. The method as in claim 1, further comprising:
    having the public network a telephone network.

12. The method as in claim 1, further comprising:
    having the public network capable of carrying telephone calls.

13. A call management apparatus, comprising:
    a call routing engine;
    means for receiving at the engine a first message for causing the engine to initiate establishment of a post-routing call processing of a call established through a public network between a calling device and a called device, the message initiated by the called device;

means for issuing from the engine a second message for initiating the establishment through the public network of the post-routing call processing; and means for issuing from the engine a third message to the called device indicating processing of the first message.

14. The apparatus as in claim 13, further comprising:

means for establishing as the post-routing call processing a call between the calling device, the called device, and another called device.

15. The apparatus as in claim 13, further comprising:

means for establishing as the post-routing call processing a call between the calling device and another called device, and removing the called device from the call.

16. The apparatus as in claim 13, further comprising:

means for establishing as the post-routing call processing a call between the called device and another called device;

means for placing the calling device in a hold status.

17. The apparatus as in claim 16, further comprising:

means for disconnecting the another called device;

means for removing the calling device from the hold status; and means for re-establishing a call between the calling device and the called device.

18. The apparatus as in claim 13, further comprising:

means for controlling the public network by the call routing engine to establish the post-routing call processing.

19. The apparatus as in claim 13, further comprising:

means for having a voice response unit (VRU) connected to the public network as the called device.

20. The apparatus as in claim 13, further comprising:

means for having an automatic call distribution system (ACD) connected to the public network as the called device.

21. The apparatus as in claim 13, further comprising:

means for having the calling device external to a VRU, where the VRU includes the called device.

22. The apparatus as in claim 13, further comprising:

means for having the calling device external to a ACD, where the ACD includes the called device.

23. The apparatus as in claim 13, further comprising:

means for having the public network a telephone network.

24. The apparatus as in claim 13, further comprising:

means for having the public network capable of carrying telephone calls.

25. A call management apparatus, comprising:

a call routing engine, the engine receiving a first message, the first message for causing the engine to initiate establishment of a post-routing call processing of a call established through a public network between a calling device and a called device, the message initiated by the called device;

a second message issued from the engine, the second message for initiating the establishment through the public network of the post-routing call processing; and a third message issued from the engine to the called device, the third message indicating processing of the first message.

26. The apparatus as in claim 25, the post-routing call processing further comprising:

a call between the calling device, the called device, and another called device.

27. The apparatus as in claim 25, the post-routing call processing further comprising:

a call between the calling device and another called device, and removing the called device from the call.

28. The apparatus as in claim 25, the post-routing call processing further comprising:

a call between the called device and another called device, and the calling device placed in a hold status.

29. The apparatus as in claim 28, further comprising:

the another called device disconnected, the calling device removed from the hold status, and a call re-established between the calling device and the called device.

30. The apparatus as in claim 25, further comprising:

the public network controlled by the call routing engine to establish the post-routing call processing.

31. The apparatus as in claim 25, further comprising:

a voice response unit (VRU) connected to the public network as the called device.

32. The apparatus as in claim 25, further comprising:

an automatic call distribution system (ACD) connected to the public network as the called device.

33. The apparatus as in claim 25, further comprising:

the calling device external to a VRU, where the VRU includes the called device.

34. The apparatus as in claim 25, further comprising:

the calling device external to a ACD, where the ACD includes the called device.

35. The apparatus as in claim 25, further comprising:

the public network is a telephone network.

36. The apparatus as in claim 25, further comprising:

the public network is capable of carrying telephone calls.

37. A computer readable media, comprising:

said computer readable media having instructions written thereon for execution on a processor for the practice of the method of claim 1.

38. Electromagnetic signals propagating on a computer network, comprising:

said electromagnetic signals carrying instructions for execution on a processor for the practice of the method of claim 1.

* * * * *